(12) United States Patent
Easley, Jr.

(10) Patent No.: US 6,854,754 B1
(45) Date of Patent: Feb. 15, 2005

(54) WHEELCHAIR WITH BRAKE ASSEMBLY

(76) Inventor: J. Alexander Easley, Jr., P.O. Box 1213, Kokomo, IN (US) 46903

( * ) Notice: Subject to any disclaimer, the term of this patent is extended or adjusted under 35 U.S.C. 154(b) by 0 days.

(21) Appl. No.: 10/640,548

(22) Filed: Aug. 13, 2003

(51) Int. Cl.[7] ................................................. B60T 1/04
(52) U.S. Cl. ................. 280/304.1; 280/642; 280/250.1; 188/2 F
(58) Field of Search ....................... 188/2 F; 280/304.1, 280/250.1, 642, 644, 649, 650, 47.38

(56) References Cited

U.S. PATENT DOCUMENTS

| | | | |
|---|---|---|---|
| 3,529,700 A | | 9/1970 | Marshall |
| 4,271,933 A | * | 6/1981 | Pearce et al. ................ 188/2 F |
| 4,350,227 A | * | 9/1982 | Knoche ........................ 188/2 F |
| 4,384,732 A | * | 5/1983 | Wierwille ................ 280/304.1 |
| D289,507 S | | 4/1987 | Danielsson |
| 4,735,431 A | * | 4/1988 | Tait .......................... 280/250.1 |
| 4,852,697 A | | 8/1989 | Kulik |
| 5,605,345 A | * | 2/1997 | Erfurth et al. ........... 280/250.1 |
| 5,667,236 A | | 9/1997 | Murphy |
| 5,678,665 A | * | 10/1997 | Debreczeni ................. 188/344 |
| 5,894,912 A | | 4/1999 | Dobben |
| 5,954,161 A | | 9/1999 | Lee |
| 5,984,334 A | | 11/1999 | Dugas |
| 6,032,765 A | | 3/2000 | Hsi-Chia |

FOREIGN PATENT DOCUMENTS

JP 10-43245 * 2/1998 ............ A61G/5/02

* cited by examiner

Primary Examiner—Avraham Lerner
(74) Attorney, Agent, or Firm—Bruce J. Bowman

(57) ABSTRACT

A wheelchair brake system is provided that allows an operator of the brake system to retard and/or stop the motion of the wheelchair. The brake system provides for independent and variable application of a braking force to wheels of the wheelchair. The brake system includes first and second brake force application assemblies, first and second braking assemblies, and actuation lines coupling the respective brake force application assembly to the braking assembly. The brake force application assemblies may be associated with handles of the wheelchair that allow a secondary or ancillary operator to apply a braking force, but may be associated with armrests of the wheelchair for use by an occupant. The brake force application assemblies are rotationally positionable and/or pivotally positionable to achieve various orientations thereof. This provides ergonomic placement of the handles for comfort and ease of brake force application.

15 Claims, 4 Drawing Sheets

WHEELCHAIR WITH BRAKE ASSEMBLY

BACKGROUND

1. Field of the Invention

The present invention relates to wheelchairs and, more particularly, to a brake system for a wheelchair.

2. Background Information

Currently, almost all wheelchairs use a side-mounted locking lever brake system that is operable by a user of the wheelchair (i.e. a seated person) in order to enable the user to more safely enter (i.e. sit) and leave the seat of the wheelchair. These conventional brake mechanisms typically consist of a pair of levers, each one engaging the exterior or outside periphery of the larger wheels of the wheelchair. To immobilize the wheelchair, the levers must be manually actuated to engage the wheels.

Albeit somewhat effective, this type of braking system is positioned such that is readily accessible only by the patient and since many patients are provided locomotion by an ancillary aid (i.e. person), the position of such brakes is not suitable for the person pushing the wheelchair. Moreover, this type of braking system is designed to immediately immobilize the large wheels of the wheelchair and thus the wheelchair, particularly for either maintaining a position of the wheelchair or for allowing a person to get into or out of the wheelchair, rather than provide a gradual braking system for the ancillary person guiding or pushing the wheelchair.

Furthermore, since many public areas like shopping centers are providing wheelchair ramps and since not everyone pushing a wheelchair is suitably strong enough to prevent a patient and his wheelchair from uncontrollably rolling down these ramps and other obstacles, it would be prudent to provide a braking or motion retardation system for the wheelchair that is used by an ancillary person controlling the motion of the wheelchair. Various solutions, such as the U.S. Patents discussed below, have been devised in order to address this issue. These systems, however, are inadequate for obvious reasons.

U.S. Pat. No. 3,529,700 discloses a brake assembly for a wheelchair that includes spring loaded brake elements mounted on the main frame of the wheelchair that are normally biased toward wheel engagement. The spring loaded brake elements are disengaged from the wheels in response to a seat controlled linkage (engages and disengages in response to a person sitting or not) or by a manually operative disengagement device. This system, however, is complicated with its various springs and levers. Moreover, the brake levers to be used by the ancillary person are awkwardly positioned.

U.S. Pat. No. 4,852,697 discloses a brake device for a wheelchair that is adapted to be engaged by a secondary operator of the wheelchair. The brake device includes a mounting bracket attached to a handle of the wheelchair and carrying actuator linkage (brake arm) coupled to an actuator tube and stopper. The actuator linkage moves the attached stopper in engagement with the rear wheel of the wheelchair to lock the wheel against rotation. Again, however, this brake system is complicated with its various linkage. Moreover, the handles for the actuator linkage that is used by the secondary operator are awkwardly positioned.

U.S. Pat. No. 5,667,236 discloses a control grip brake for a wheelchair that includes an internal steel sleeve adapted for rotatable coupling with an existing handle of a wheelchair. A steel spring coil applies a clockwise/counter clockwise tension on the internal steel sleeve. An outer hand grip is adapted for securement over the internal steel sleeve and is utilized to actuate a brake mechanism that is secured to a steel cable that is coupled with a wheel of the wheelchair. This brake system thus applies the braking power through rotation of the hand grips. Since the hand grips are grasped with the palms of the hand facing inwardly and the backs of the hand facing outwardly, this also results in an awkward grasping and/or actuation position for the braking system.

U.S. Pat. No. 5,894,912 discloses a wheelchair braking device that is adapted to automatically engage when the wheelchair to which the device is mounted is unoccupied. This wheelchair braking device, however, utilizes a complex series of levers and interconnections therebetween. Moreover, this braking device positions a secondary or ancillary operator's hands in the typical awkward palms in and backside out position that is not conducive to allowing the hand to transmit sufficient torque for braking.

What is therefore needed in view of the above, is a motion retardation system for a wheelchair that is usable by a secondary or ancillary person.

What is therefore also needed in view of the above, is a selectively engageable motion retardation system for a wheelchair that may be operatively mounted at various locations on the wheelchair depending on the intended user of the motion retardation system.

What is therefore further needed in view of the above, is a brake system for a wheelchair that provides ergonomic positioning of a braking force application device particularly for pushing the wheelchair and applying a braking force thereto.

What is therefore still further needed in view of the above, is a brake system for a wheelchair which applies a sufficient braking force to the wheelchair for a given amount of applied braking force.

What is therefore even further needed in view of the above, is a brake system for a wheelchair that is usable by a secondary or ancillary person and which provides a simple, yet efficient transfer of applied braking force to the wheel structure of the wheelchair.

SUMMARY

A wheelchair motion retardation or brake/braking system is provided that allows a user to retard and/or stop the motion of the wheelchair. The brake system provides for independent and variable application of a braking force to wheels of the wheelchair. The brake system includes first and second brake force application assemblies, first and second braking assemblies, and actuation lines coupling each brake force application assembly to a respective braking assembly. The brake system may be mounted for use by a user or occupant of the wheelchair and/or by an ancillary user of the wheelchair.

In one form, the brake force application assemblies are associated with rearward oriented handles of the wheelchair for grasping and actuation by an ancillary user (pusher) of the wheelchair. In another form, the brake force application assemblies are associated with arms or armrests of the wheelchair for grasping and actuation by an occupant of the wheelchair. The brake force application assemblies in all cases are rotationally positionable and/or pivotally positionable (i.e. selectively oriented) in various orientations to accommodate the preferences of the ancillary user. This provides ergonomic placement of the brake force application assemblies for comfort and ease of brake force application by the user. Additionally, each braking assembly is preferably situated relative to a respective first and second wheel of the wheelchair so as to apply a braking force to an axial or rim portion of the respective wheel.

In one embodiment, the subject invention is a wheelchair having a frame, an axle carried by the frame, a first wheel supported on a first rim and carried for rotation on the axle, a second wheel supported on a second rim and carried for rotation on the axle, first and second handles carried by respective first and second handle portions of the frame and positioned to allow a person to grasp the first and second handles when situated behind the wheelchair in order to move the wheelchair, the first and second handles each pivotally coupled to the respective first and second handle portions of the frame to define a first position and a second position, the first position situating the handle in a user operation position wherein the handle is parallel to ground, and the second position situating the handle in a stowed position wherein the handle is perpendicular to ground. The wheelchair further includes a first brake assembly having a first braking force application component, a first wheel braking component, and a first actuation cable operatively coupling the first braking force application component with the first wheel braking component, the first braking force application component associated with the first handle and operative to pivot with the first handle, and the first wheel braking component situated proximate the first wheel to provide selective frictional engagement with the first wheel when a braking application force is applied to the first braking force application component, and a second brake assembly having a second braking force application component, a second wheel braking component, and a second actuation cable operatively coupling the second braking force application component with the second wheel braking component, the second braking force application component associated with the second handle and operative to pivot with the second handle, and the second wheel braking component situated proximate the second wheel to provide selective frictional engagement with the second wheel when a braking application force is applied to the second braking force application component.

In another embodiment, the subject invention is a wheelchair having a frame, an axle carried by the frame, a first wheel supported on a first rim and carried for rotation on the axle, the first wheel having a first tire supported on a first rim and defining a first upper surface adapted to contact ground, the first rim defining first inner and outer side surfaces, a second wheel supported on a second rim and carried for rotation on the axle, the second wheel having a second tire supported on a second rim and defining a second upper surface adapted to contact ground, the second rim defining second inner and outer side surfaces, first and second handles carried by respective first and second handle portions of the frame and positioned to allow a person to grasp the first and second handles when situated behind the wheelchair in order to move the wheelchair, a first brake assembly having a first braking force application component, a first wheel braking component, and a first actuation cable operatively coupling the first braking force application component with the first wheel braking component, the first braking force application component associated with the first handle, and the first wheel braking component is situated proximate the first wheel to provide selective frictional engagement with the first rim of said first wheel when a braking application force is applied to the first braking force application component, and a second brake assembly having a second braking force application component, a second wheel braking component, and a second actuation cable operatively coupling the second braking force application component with the second wheel braking component, the second braking force application component associated with the second handle, and the second wheel braking component is situated proximate the second wheel to provide selective frictional engagement with the second rim of the second wheel when a braking application force is applied to the second braking force application component.

In yet another embodiment, the subject invention is a wheelchair having a frame, an axle carried by the frame, a first wheel rotatably supported by the axle and a second wheel rotatably supported by the axle. The wheelchair further includes a first brake assembly having a first braking force applicator, a first wheel braking applicator, and a first actuator operatively coupling the first braking force applicator to the first wheel braking applicator. The first braking force applicator is movable into a first and second angular orientation corresponding to a use position and a stowed position. The wheelchair further includes a second brake assembly having a second braking force applicator, a second wheel braking applicator, and a second actuator operatively coupling the second braking force applicator to the second wheel braking applicator. The second braking force applicator is movable into a first and second angular orientation corresponding to a use position and a stowed position.

In still another embodiment, the subject invention is a wheelchair having a frame, an axle carried by the frame, a first wheel rotatably supported by the axle, and a second wheel rotatably supported by the axle. The wheelchair further includes a first brake system mounted on the wheelchair for use by an ancillary operator of the wheelchair and operative to receive a first braking force applied b the ancillary operator and translate the applied first braking force to the first and second wheels, and a second brake system mounted on the wheelchair for use by an occupant of the wheelchair and operative to receive a second braking force applied by the occupant and translate the applied second braking force to the first and second wheels.

BRIEF DESCRIPTION OF THE DRAWINGS

In the drawings.

Corresponding reference characters indicate corresponding parts throughout the several views. Like reference characters tend to indicate like parts throughout the several views.

DESCRIPTION OF THE PREFERRED EMBODIMENT

Figure 1:
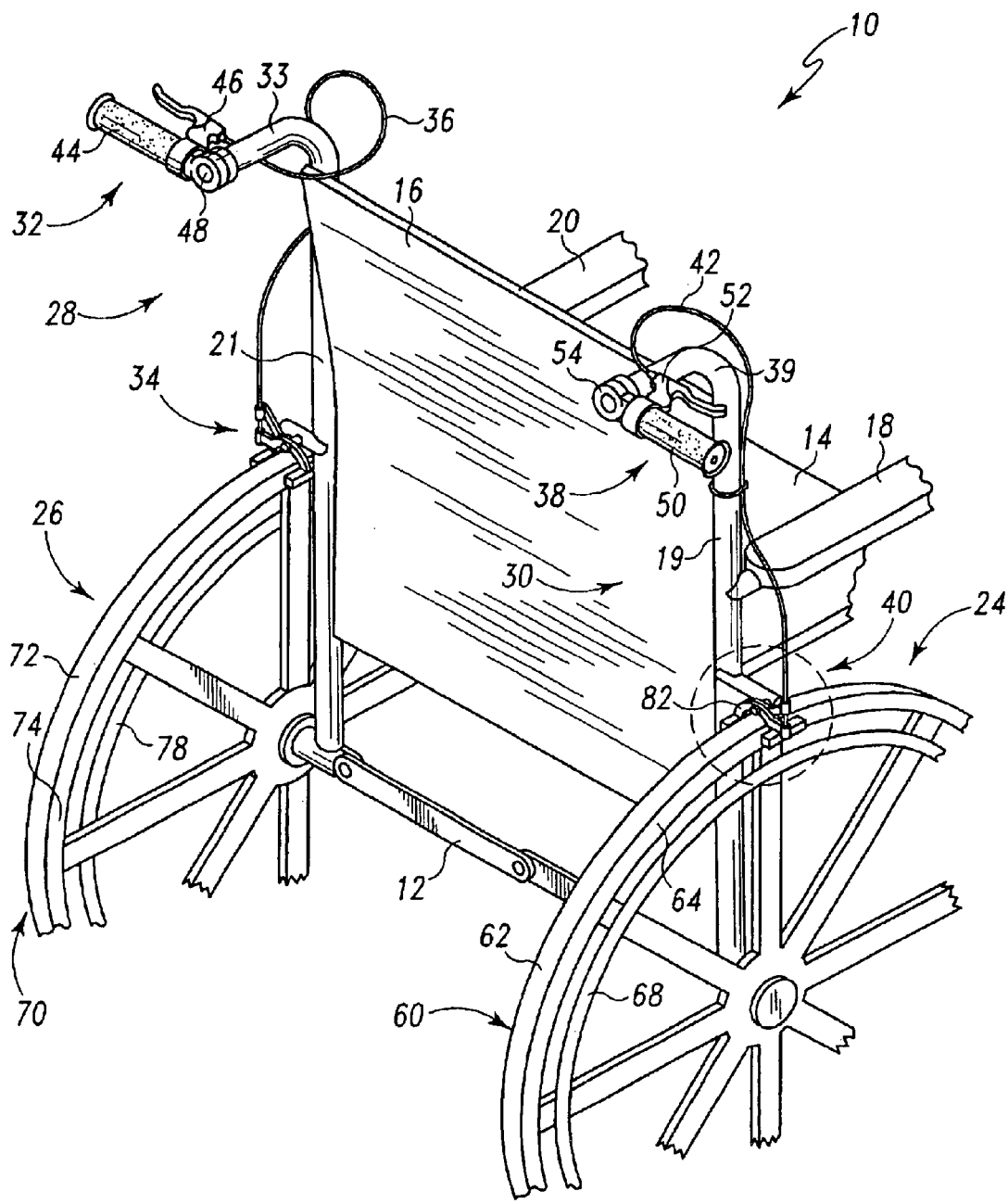
FIG. 1 is a rear perspective view of a wheelchair having an exemplary brake system in accordance with the principles of the subject invention.

While the invention is susceptible to various modifications and alternative forms, specific embodiments thereof have been shown by way of example in the drawings and will herein by described in detail. It should be understood, however, that there is no intent to limit the invention to the particular forms disclosed, but on the contrary, the intention is to cover all modifications, equivalents, and alternatives falling within the spirit and scope of the invention.

Referring now to FIG. 1 there is shown an exemplary embodiment of a wheelchair generally designated 10 in which the subject invention is embodied. The wheelchair 10 includes a frame 12 that may be foldable such that the wheelchair 10 is collapsible such as is known in the art. The frame 12 supports a seat 14 and a back 16. The seat 14 and back 16 are typically, but not necessarily, made of a cloth, vinyl or other type of soft material that allows the collapsing or folding thereof in connection with a collapsing frame and provides a relatively soft support surface.

A right armrest 18 is provided that extends from a right post 19 of the frame 12. The right post 19 terminates in a right handle reception portion 39 that is curved rearwardly. A left armrest 20 is provided that extends from a left post 21 of the frame 12. The left post 21 terminates in a left handle reception portion 33 that is curved rearwardly. The wheelchair 12 also includes a first or right large wheel assembly 24 and a second or left large wheel assembly 26. It should be appreciated that while not shown, the wheelchair 10 also includes other features that are typical of wheelchairs such as retractable footrests, front wheels and/or the like. As such, it should be understood that the form of the wheel chair 10 as shown is only exemplary of a wheelchair in which the subject invention is used. The subject invention is thus applicable to other forms of wheelchairs.

In accordance with an aspect of the subject invention, the wheelchair 10 includes a first brake assembly 28 and a second brake assembly 30 together defining a first brake system. It should be appreciated that the nomenclature "first" and "second" is arbitrary with respect to the brake assemblies, and throughout. The first brake assembly 28 is arbitrarily associated with the left (first) wheel assembly or structure 26 and the left handle reception portion 33. The second brake assembly 30 is arbitrarily associated with the right (second) wheel assembly or structure 24 and the right handle reception portion 39. Particularly, the first brake assembly 28 is utilized by a left hand of an operator of the wheelchair (not shown) to control braking of the left wheel assembly 26, while the second brake assembly 30 is utilized by a right hand of the operator of the wheelchair (not shown) to control braking of the right wheel assembly 24.

The first brake assembly 28 includes a first brake or braking force application assembly, structure or device 32, a first braking assembly, structure or device 34, and a first actuation cable or line 36. The second brake assembly 30 includes a second brake or braking force application assembly, structure or device 38, a second braking assembly, structure or device 40, and a second actuation cable or line 42.

The first braking force application assembly 32 is associated with the left handle reception portion 33, with the first braking assembly 34 being associated with the left wheel assembly 26. The actuation cable 36 is operatively coupled to and between the first braking force application assembly 32 and the first braking assembly 34 and is operative to transmit or transfer a braking force applied to and thus from the first braking force application assembly 32 to the first braking assembly 34.

The second braking force application assembly 38 is associated with the right handle reception portion 39, with the second braking assembly 40 being associated with the right wheel assembly 24. The actuation cable 42 is operatively coupled to and between the second braking force application assembly 38 and the second braking assembly 40 and is operative to transmit or transfer a braking force applied to and thus from the second braking force application assembly 38 to the second braking assembly 40.

It should be appreciated that while the first and second braking force application assemblies 32, 38 are shown mounted to handles of the wheelchair that are usable by a secondary or ancillary user of the wheelchair (as opposed to a first or primary user, i.e. person sitting in the wheelchair), the first and second braking force application assemblies may be mounted on the wheelchair for use by the primary user. To this end, the first and second braking force applicators 32, 38 may be mounted to the wheelchair armrests 20 and 18.

The first braking force application assembly 32 includes a first handle 44, a first brake lever assembly 46, and a first joint 48 pivotally connecting the first handle 44 to the left handle reception portion 33. As explained further below, the first joint 48 allows the first handle 44 and the first brake lever assembly 46 to rotate about a longitudinal axis of the reception portion 33. In this manner, the first brake lever assembly 46 may be advantageously rotationally positioned to accommodate a particular user. Additionally, the first brake lever assembly 46 may be rotationally advantageously positioned for storage of the wheelchair 10 when the wheelchair 10 is folded. The first brake lever assembly 46 is operative, configured and/or adapted to receive a braking force applied by a hand of a user. This braking force is transmitted via the cable 36 to the first braking assembly 34. Without being limiting, the first braking assembly 34 includes a caliper assembly 80. The cable 36 is operatively coupled to the caliper assembly 80 in order to actuate the caliper assembly 80. Actuation of the caliper assembly 80 provides a frictional braking force against the wheel assembly 26.

Particularly, the wheel assembly 26 includes a tire 70 such as is known in the art for wheelchairs. The tire 70 defines an annular top or peripheral surface 72, an inside rim or rail surface 74 and an outside rim or rail surface (not seen in FIG. 1). The wheel assembly 26 also includes an annular handrail 78 that is adapted and/or configured to allow a person seated in the wheelchair 10 to manually move the wheel assembly 26. The caliper assembly 80 is situated or positioned around the tire 70 such that the caliper assembly 80 causes frictional engagement between the caliper assembly 80 and the inside and outside rim or rail surfaces of the tire 72/wheel assembly 26 during application of a braking force.

The second braking force application assembly 38 includes a second handle 50, a second brake lever assembly 52, and a second joint 54 pivotally connecting the second handle 50 to the right handle reception portion 39. As explained further below, the second joint 54 allows the second handle 50 and the second brake lever assembly 52 to rotate about a longitudinal axis of the reception portion 39. In this manner, the second brake lever assembly 52 may be advantageously rotationally positioned to accommodate a particular user. Additionally, the second brake lever assembly 52 may be rotationally advantageously positioned for storage of the wheelchair 10 when the wheelchair 10 is folded. The, second brake lever assembly 52 is operative, configured and/or adapted to receive a braking force applied by a hand of a user. This braking force is transmitted via the cable 42 to the second braking assembly 40. Without being limiting, the first braking assembly 40 includes a caliper assembly 82. The cable 42 is operatively coupled to the caliper assembly 82 in order to actuate the caliper assembly 82. Actuation of the caliper assembly 82 provides a frictional braking force against the wheel assembly 24.

Particularly, the wheel assembly 24 includes a tire 60 such as is known in the art for wheelchairs. The tire 60 defines an annular top or peripheral surface 62, an inside rim or rail surface (not seen in FIG. 1) and an outside rim or rail surface 64. The wheel assembly 24 also includes an annular hand rail 68 that is adapted and/or configured to allow a person seated in the wheelchair 10 to manually move the wheel assembly 24. The caliper assembly 82 is situated or positioned around the tire 60 such that the caliper assembly 82 causes frictional engagement between the caliper assembly 82 and the inside and outside rim or rail surfaces of the tire 62/wheel assembly 24 during application of a braking force.

While the joints 48 and 54, and thus the respective braking force application assemblies 32 and 38 appear fixed with respect to the respective handle reception portions 33 and 39, this may not necessarily be the case. For example, the assemblies 32 and 38 may be retrofittable into the reception portions 33 and 39. One manner of accommodating this configuration is to have the respective joints 48 and 54 be attached to extensions or tubes that fit into or over the ends of the reception portions 33 and 39. The extensions would be fastened to the extension portions either in a removable or fixed manner.

Figure 2:
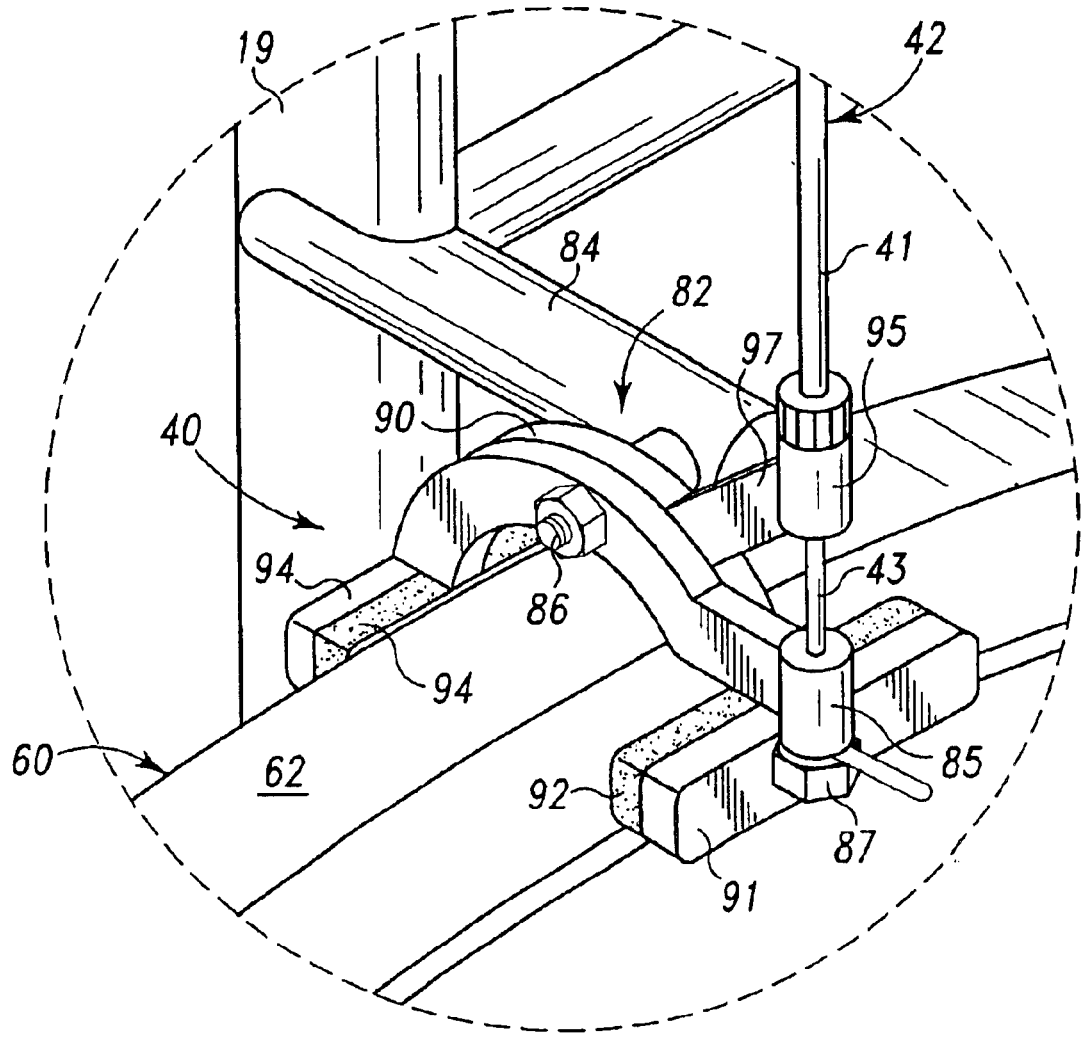
FIG. 2 is an enlarged perspective view of the wheelchair particularly depicting the braking assembly of the subject brake system in accordance with the principles of the subject invention.

Referring now to FIG. 2, there is depicted the second braking assembly 40 in greater detail. It should be appreciated that the description with respect to the second braking assembly 40 is applicable to the first braking assembly 34. Thus, the first braking assembly 34 will not be described since its operation is identical to the following detail with respect to the second braking assembly 40.

The second braking assembly 40 includes the caliper assembly 82. The caliper assembly 82 is mounted to the post 19 via a mounting arm 84 that extends from the post 19, and a mounting/pivot pin 86. The caliper assembly 82 includes first and second calipers 88 and 90 each one of which carries a respective brake pad holder 91, 93 carrying a respective brake pad 92, 94. The cable 42 is coupled to at least one of the first and second calipers 88 and 90 such that actuation motion is transmitted to the first and second calipers 88 and 90. As shown, the cable 42 a sheath 41 covering a wire 43. The cable 42 is attached to a cylindrical flange 95 that is attached via an arm 97 to the caliper 90. The wire 93 extends through the flange 95 and through a second cylindrical flange 85. The wire 93 is fixed to the flange 85 by a nut 87. The flange 85 is fixed to the caliper 88.

Application of the breaking force to the cable 42 causes the wire 43 to pull on the flange 85. Since the flange 85 is connected to the caliper 88, the caliper 88 pivots about the pin (axis) 86 to cause the brake pad 94 (fixed to the caliper 88 via the pad holder 93) to exert the braking force on the rim of the tire. As well, this causes the caliper 90 to pivot causing the brake pad 92 (attached to the caliper 90 via the pad holder 93) to exert the braking force on the other rim 64 of the tire 62.

In any case, actuation force transmitted by the cable 42 causes the calipers 88 and 90 to move inwardly toward the tire 60. A first brake pad 92 is associated with the caliper 88 while a second brake pad 94 is associated with the caliper 90. The first and second brake pads 92 and 94 engage the respective sides 64, 66 of the tire 60 (rather than the top 62 thereof) upon actuation. This frictional engagement stops rotation of the wheel assembly 24.

The caliper assembly 82 is preferably normally biased in an open position. Correspondingly, the second brake force application assembly 38 is normally biased in an open position. Therefore, in order to apply a braking force to the wheel assembly 24, a positive force (by the hand of the operator) must be applied to the second brake force application assembly 38 that is transmitted via the cable 42 to the caliper assembly 82. As long as the braking force is applied, the caliper assembly 82 frictionally engages the wheel assembly 24 in order to stop and/or hinder rotation thereof. Again, it should be appreciated that the first brake force application assembly 32, the cable 36, and the first braking assembly 34 function and/or perform in the same manner.

The brake assemblies 34 and 40 may be off the shelf type brakes such as are used with bicycles and the like. Moreover, other types of assemblies such as center-pull systems and the like may be used.

Figure 3:
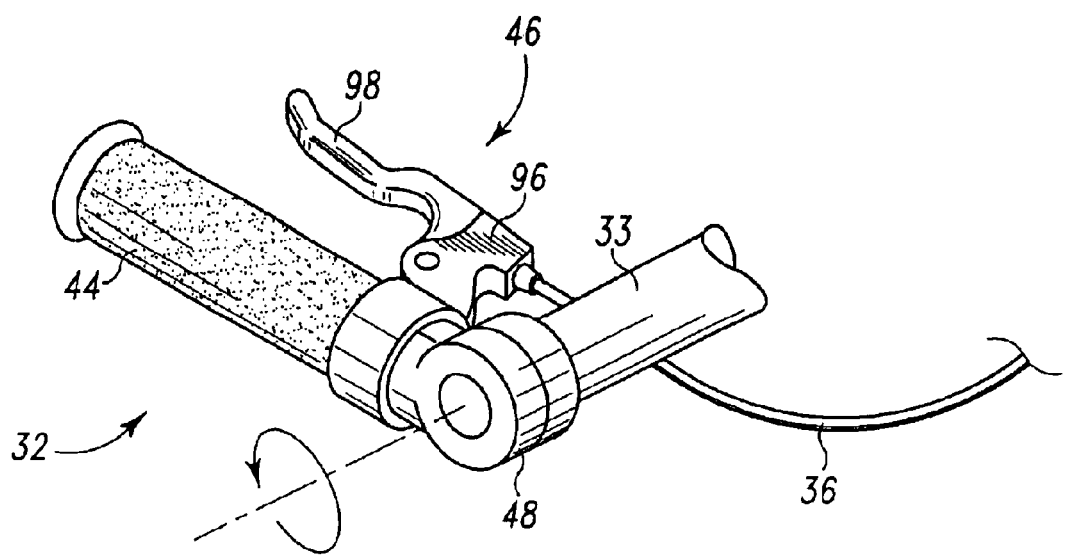
FIG. 3 is an enlarged perspective view particularly depicting the handle assembly of the subject brake system for the wheelchair in accordance with the principles of the subject invention.

Referring now to FIG. 3, there is depicted an enlarged view of the first brake force application assembly 32. It should be appreciated that the features, functions and/or manner of operation of the first brake force application assembly 32 are the same as the second brake force application assembly 38. Therefore, the second brake force application assembly 38 is not hereinafter discussed in detail. The first brake force application assembly 32 includes the first brake lever assembly 46 that is associated with the first handle 44. The first brake lever assembly 46 includes a brake lever 98 that is operatively attached to a mounting bracket 96. The mounting bracket 96 is attached to the handle 44 or proximate thereof adjacent the joint 48. The lever 98 is actuated by hand pressure when the hand is in a normally extended state (i.e. the palm down and the backside of the hand up). As hand pressure (i.e. braking force) is applied to the brake lever 98, the brake lever 98 moves inwardly toward the handle 44. This actuates the cable 36 that translates (transmits) this force to the first brake assembly 34.

The brake force application assemblies are similar, if not identical to ones used for bicycles and the like. As such, the current brake force assemblies 32 and 38 may be off-the-shelf type components.

Figure 4:
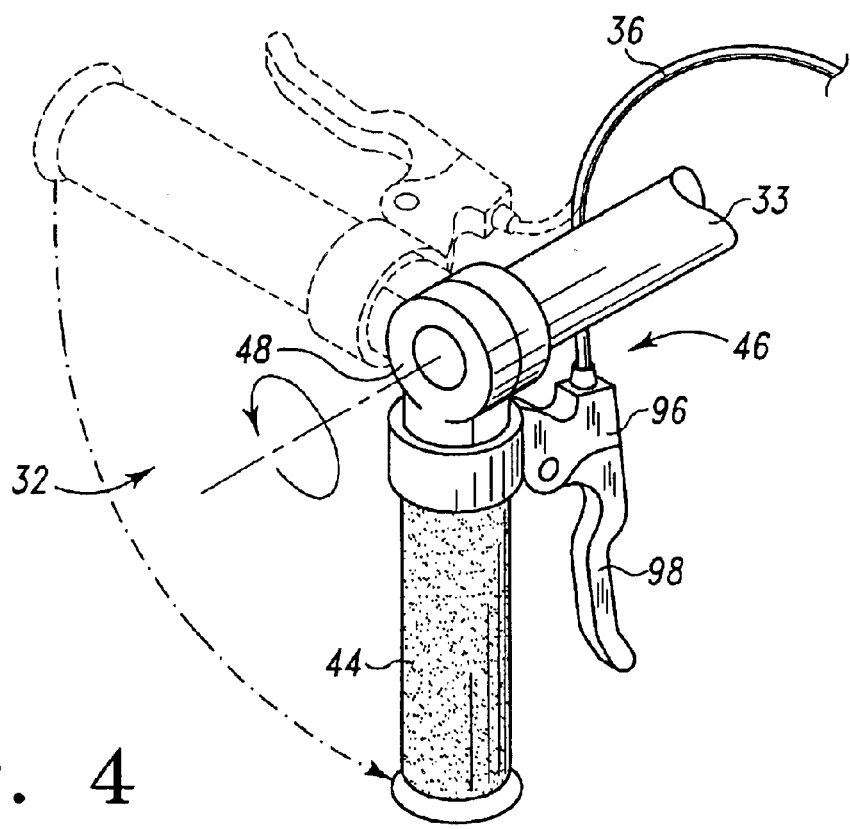
FIG. 4 is the enlarged perspective view particularly depicting the various positions achievable by the handle assembly of the subject brake system in accordance with the principles of the subject invention.

Referring to FIG. 4, there is depicted the first brake force application assembly 32. Particularly, the handle 44 and associated first brake lever assembly 46 are depicted in FIG. 4 illustrating a manner in which the handle 44 and the associated first brake lever assembly 46 pivot, fold, collapse or the like with respect to the left handle reception portion 33, particularly with respect to the longitudinal axis of the reception portion 33. The handle 44 and thus the first brake lever assembly 46 are attached to the joint 48. The joint 48 allows selectively releasable locking positions for the handle 44 and thus the first brake lever assembly 46. In one form, the joint 48 allows the handle 44 and first brake lever assembly 46 to be in two positions, i.e. a stowed position as depicted by solid lines in FIG. 4 (i.e. essentially perpendicular with respect to the ground), and a use position depicted by dashed lines in FIG. 4 (i.e. essentially parallel with the ground). In another form, the handle and brake lever assembly may have one or more preferably lockable intermediate positions between those depicted in FIG. 4. This allows the handle/brake lever assembly to fold as the wheelchair is folded. It should be appreciated that the second brake force application assembly 38 functions in the same manner as the first brake force application assembly 32 described above.

Figure 5:
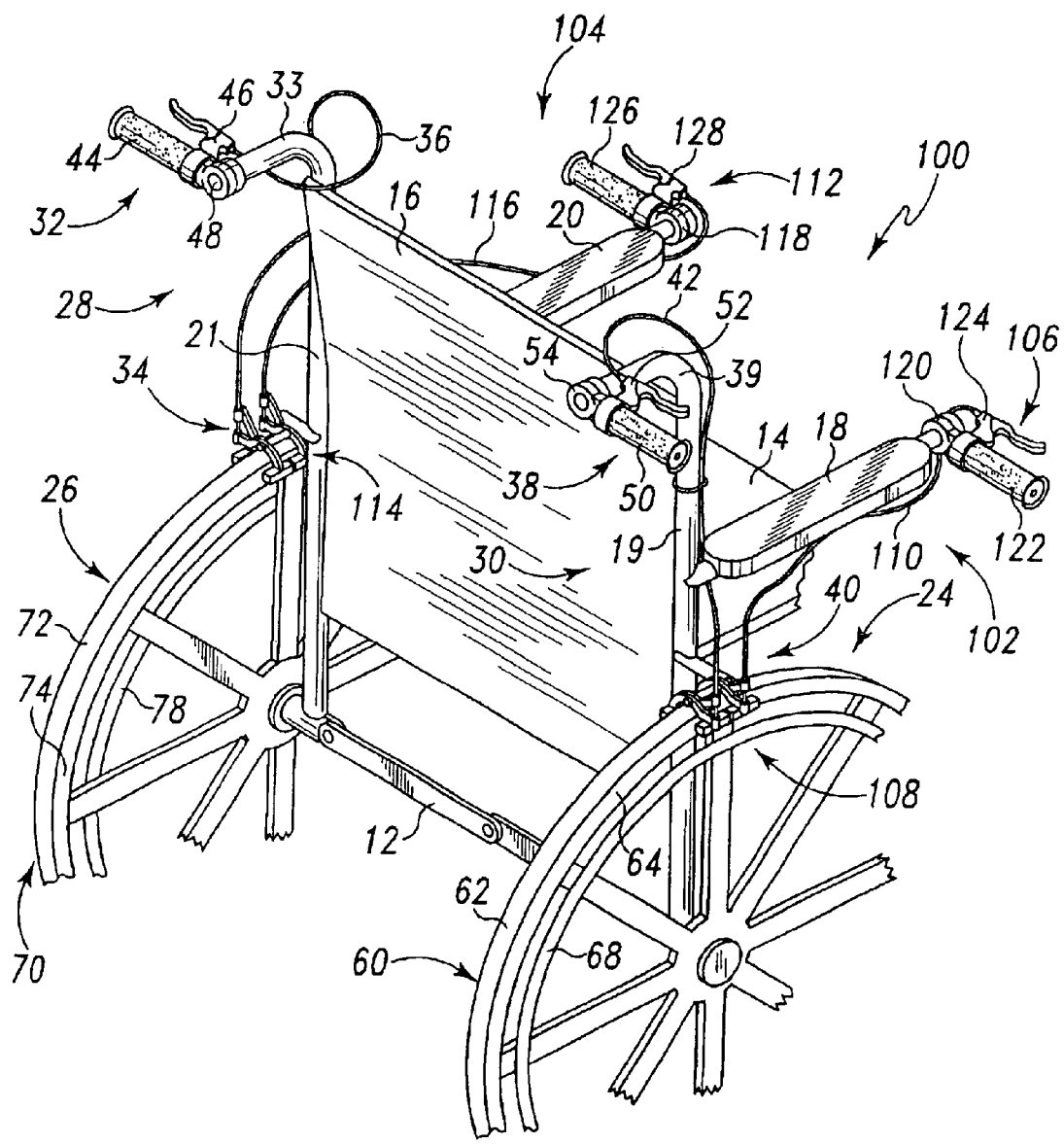
FIG. 5 is a rear perspective view of another wheelchair having another exemplary brake system in accordance with further principles of the subject invention.

Referring now to FIG. 5, there is depicted another wheelchair generally designated 100 that includes the same elements and the first brake system as discussed above. The wheelchair 100, however, is shown with a second brake system in addition to the first brake system. It should be appreciated that the second brake system may be in addition to the first brake system or may be used in place of the first brake system. In all manners, however, the second brake system as described below, functions and/or operates in at least the same manner as the first brake system. Therefore, only the various general components of the second brake system will be discussed.

The second brake system is defined by a third braking assembly 102 and a fourth braking assembly 104. The third braking assembly 102 includes a brake force applicator 106, a braking applicator 108, and an actuation line 110 operatively coupling the brake force applicator 106 with the braking applicator 108. The fourth braking assembly 104 includes a brake force applicator 112, a braking applicator 114, and an actuation line 116 operatively coupling the brake force applicator 112 with the braking applicator 114.

The brake force applicator 106 includes a handle 120 and a force applicator 124 that is operative to receive a braking force from an occupant of the wheelchair and translate the force via the actuation line 110 to the braking applicator 108. The brake force applicator 106 is mounted to the arm or armrest 18 via a pivot 120. The pivot 120 allows the brake force applicator 106 to be angularly positionable into at least two positions (a use position as depicted, and a stowed position wherein the handle 122 is oriented downward) and, preferably positionable into a plurality of angular orientations.

In like manner, the brake force applicator 112 includes a handle 126 and a force applicator 128 that is operative to receive a braking force from an occupant of the wheelchair and translate the force via the actuation line 116 to the braking applicator 114. The brake force applicator 112 is mounted to the arm or armrest 20 via a pivot 118. The pivot 118 allows the brake force applicator 106 to be angularly positionable into at least two positions (a use position as depicted, and a stowed position wherein the handle 126 is oriented downward) and, preferably positionable into a plurality of angular orientations.

The braking applicator 108 is mounted for retardation or braking of the wheel assembly 24 in like manner to the braking applicator 40. The braking applicator 108 also operates in a like manner to the braking applicator 40 in order to apply a retarding or braking force to the rim 64 of the wheel 60.

In like manner, the braking applicator 114 is mounted for retardation or braking of the wheel assembly 26 in like manner to the braking applicator 34. The braking applicator 114 also operates in a like manner to the braking applicator 34 in order to apply a retarding or braking force to the rim 74 of the wheel 70.

It should be appreciated that various types of joints may be used and are thus represented by that shown. For example, a ratchet type mechanism, a locking pin mechanism and/or the like may be used in order to provide a releasable locking joint.

It should be appreciated that the subject brake system may be installed at the time of manufacture of the wheelchair or may be installed after the manufacture thereof. In the case of after-production installation, the subject brake system may be provided as a kit. The kit may or may not allow a retro-fitted wheelchair to have every feature and/or function described above such as the selectively positionable handle/brake force application assembly. The kit may, for example, include right and left brake assemblies, right and left brake force application assemblies, and two cables. Mounting hardware may, for example, includes brackets for attaching the brake assemblies. Other configurations are contemplated.

What is claimed is:

1. A wheelchair comprising:

a frame;

an axle carried by said frame;

a first wheel supported on a first rin and carried for rotation on said axle;

a second wheel supported on a second rim and carried for rotation on said axle;

first and second handles carried by respective first and second handle portions of said frame and positioned to allow a person to grasp said first and second handles when situated behind the wheelchair in order to move the wheelchair, said first and second handles each pivotally coupled to said respective first and second handle portions of said frame to define a first position and a second position, said first position situating the handle in a user operation position wherein the handle is parallel to ground, and said second position situating the handle in a stowed position wherein the handle is perpendicular to ground;

a first brake assembly having a first braking force application component a first wheel braking component, and a first actuation cable operatively coupling said first braking force application component with said first wheel braking component, said first braking force application component associated with said first handle and operative to pivot with said first handle, and said first wheel braking component situated proximate said first wheel to provide selective frictional engagement with said first wheel when a braking application force is applied to said first braking force application component; and a second brake assembly having a second braking force application component, a second wheel braking component, and a second actuation cable operatively coupling said second braking force application component with said second wheel braking component, said second braking force application component associated with said second handle and operative to pivot with said second handle, and said second wheel braking component situated proximate said second wheel to provide selective frictional engagement with said second wheel when a braking application force is applied to said second braking force application component.

2. The wheelchair of claim 1, wherein said frame is collapsible.

3. The wheelchair of claim 1, wherein said first and second wheel braking components each comprise a caliper assembly.

4. The wheelchair of claim 1, wherein said wherein said first and second braking force application components each comprise a brake lever component.

5. The wheelchair of claim 4, wherein said brake lever component comprises a brake lever operatively coupled to a brake lever bracket.

6. A wheelchair comprising:

a frame;

an axle carried by said frame;

a first wheal rotatably supported by said axle;

a second wheel rotatably supported by said axle;

a first brake assembly having a first braking force applicator mounted to said frame remote from said first wheel, a first wheel braking applicator mounted adjacent said first wheel, and a first actuator operatively coupling said first braking force applicator to said first wheel braking applicator, said first braking force applicator rotatable relative to its mounting position into a first and second angular orientation respectively corresponding to a use position and a stowed position; and a second brake assembly having a second braking force applicator mounted to said frame remote from said second wheel, a second wheel braking applicator mounted adjacent said second wheel, and a second actuator operatively coupling said second braking force applicator to said second wheel big applicator, said second braking force applicator rotatable relative to its mounting position into a first and second angular orientation respectively corresponding to a use position and a stowed position.

7. The wheelchair of claim 6, wherein:

said first braking force applicator is movable into a plurality of angular orientations including said first and second angular orientations; and said second braking force applicator is movable into a plurality of angular orientations including said first and second angular orientations.

8. The wheelchair of claim 6 wherein said first and second braking force applicators are mounted on the wheelchair for use by an ancillary operator of the wheelchair.

9. The wheelchair of claim 8, wherein said first and second braking force applicators are mounted on respective first and second handle assemblies.

10. The wheelchair of claim 6, wherein said first and second braking force applicators are mounted on the wheelchair for use by an occupant of the wheelchair.

11. The wheelchair of claim 10, wherein said fine and second braking force applicators are mounted on respective first and second arms.

12. A wheelchair comprising:

a frame;

an axle carried by said frame;

a first wheel rotatably supported by said axle;

a second wheel rotatably supported by said axle;

a first brake system mounted on the wheelchair for use by an ancillary operator of the wheelchair and operative to receive a braking force applied by the ancillary operator and translate the braking force applied by the ancillary operator to said first and second wheels, said first brake system including a first and second brake assembly each having a braking force applicator mounted to said frame remote from respective said first and second wheels and rotatable relative to their mounting position into a first and second angular orientation respectively corresponding to a use position and a stowed position, a wheel braking applicator associated with and mounted adjacent each one of said first and second wheels, and an actuator operatively coupling each braking force applicator with a respective wheel braking applicator; and a second brake system mounted on the wheelchair for use by an occupant of the wheelchair and operative to receive a second braking force applied by the occupant and translate the applied second braking force to said first and second wheels, said second brake system including a third and fourth brake assembly each having a braking force applicator mounted to said frame remote from respective said first and second wheels and rotatable relative to their mounting position into a first and second angular orientation respectively corresponding to a use position and a stowed position, a wheel braking applicator associated with and mounted adjacent each one of said first and second wheels, and an actuator operatively coupling each braking force applicator with a respective wheel braking applicator.

13. The wheelchair of claim 12, wherein said braking force applicators of said first and second brake assemblies of said first brake system are mounted on respective first and second handle assemblies of said frame; and said braking force applicators of said third and fourth brake assemblies of said second brake system are mounted on respective first and second armrests of said frame.

14. A kit for modifying an existing wheelchair to provide a wheelchair braking system for use by an individual pushing the wheelchair, the kit comprising:

a first brake assembly having a first braking force applicator, a first wheel balking applicator and a first actuator, the first braking force applicator including first braking force applicator mounting hardware configured to mount the first braking force applicator to a first rear handlebar of a frame of the wheelchair and allow the first braking force applicator to be rotatable relative to its mounting position into a first and second angular orientation respectively corresponding to a use position and a stowed position, the first wheel braking applicator including first braking applicator hardware configured to mount the first wheel braking applicator adjacent a first wheel of the wheelchair so as to apply a braking force thereto when actuated by the first braking force applicator, the first actuator configured to couple the first braking force applicator with the first wheel braking applicator to transmit a first braking force applied to the first braking force applicator to the first wheel braking applicator; and a second brake assembly having a second braking force applicator, a second wheel braking applicator and a second actuator, the second braking force applicator including second braking force applicator mounting hardware configured to mount the second braking force applicator to a second rear handlebar of a frame of the wheelchair and allow the second braking force applicator to be rotatable relative to its mounting position into a first and second angular orientation respectively corresponding to a use position and a stowed position, the second wheel braking applicator including second braking applicator hardware configured to mount the second wheel braking applicator adjacent a second wheel of the wheelchair so as to apply a braking force thereto when actuated by the second braking force applicator, the second actuator configured to couple the second braking force applicator with the second wheel braking applicator to transmit a second braking force applied to the second braking force applicator to the second wheel braking applicator.

15. The kit of claim 14, wherein:

the first braking force applicator hardware is further configured to mount the first braking force applicator to allow movement into a plurality of angular orientations including its first and second angular orientations; and the second braking force applicator hardware is further configured to mount the second braking force applicator to allow movement into a plurality of angular orientations including its first and second angular orientations.

* * * * *